(12) United States Patent
Kweon et al.

(10) Patent No.: US 7,659,962 B2
(45) Date of Patent: Feb. 9, 2010

(54) PORTABLE JIG

(75) Inventors: Hyug Jin Kweon, Kumi-shi (KR); Hae Joon Son, Kyongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 367 days.

(21) Appl. No.: 11/472,257

(22) Filed: Jun. 22, 2006

(65) Prior Publication Data

US 2006/0249426 A1    Nov. 9, 2006

Related U.S. Application Data

(62) Division of application No. 10/302,869, filed on Nov. 25, 2002, now abandoned.

(30) Foreign Application Priority Data

Jun. 14, 2002    (KR) .............................. 2002-33267

(51) Int. Cl.
*G02F 1/13*    (2006.01)
*G02F 1/1341*    (2006.01)
(52) U.S. Cl. ....................................................... 349/187
(58) Field of Classification Search ................ 349/187, 349/189, 190; 206/365, 366, 446, 722; 222/185.1; 141/2; 445/25; 430/20
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,247,377 A | 9/1993 | Omeis et al. | |
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu et al. | |
| 5,548,429 A | 8/1996 | Tsujita | |
| 5,642,214 A | 6/1997 | Ishii et al. | |
| 5,680,189 A | 10/1997 | Shimizu et al. | |
| 5,742,370 A | 4/1998 | Kim et al. | |
| 5,757,451 A | 5/1998 | Miyazaki et al. | |
| 5,852,484 A | 12/1998 | Inoue et al. | |
| 5,854,664 A | 12/1998 | Inoue et al. | |

(Continued)

FOREIGN PATENT DOCUMENTS

EP    1 003 066 A1    5/2000

(Continued)

*Primary Examiner*—David Nelms
*Assistant Examiner*—Tai Duong
(74) *Attorney, Agent, or Firm*—McKenna Long & Aldridge LLP (57) ABSTRACT

A portable jig for facilitating the transport and storage a liquid crystal syringe includes a supporting die including at least one inspection hole, at least one receiving hole for receiving at least one liquid crystal syringe at an upper portion thereof and having a flange for fixing an upper end portion of the liquid crystal syringe, and an airtight lower face.

9 Claims, 4 Drawing Sheets

U.S. PATENT DOCUMENTS

| | | | |
|---|---|---|---|
| 5,861,932 | A | 1/1999 | Inata et al. |
| 5,875,922 | A | 3/1999 | Chastine et al. |
| 5,952,678 | A | 9/1999 | Ashida |
| 5,956,112 | A | 9/1999 | Fujimori et al. |
| 6,001,203 | A | 12/1999 | Yamada et al. |
| 6,011,609 | A | 1/2000 | Kato et al. |
| 6,016,178 | A | 1/2000 | Kataoka et al. |
| 6,016,181 | A | 1/2000 | Shimada |
| 6,055,035 | A | 4/2000 | von Gutfeld et al. |
| 6,163,357 | A | 12/2000 | Nakamura |
| 6,219,126 | B1 | 4/2001 | von Gutfeld |
| 6,226,067 | B1 | 5/2001 | Nishiguchi et al. |
| 6,236,445 | B1 | 5/2001 | Foschaar et al. |
| 6,304,306 | B1 | 10/2001 | Shiomi et al. |
| 6,304,311 | B1 | 10/2001 | Egami et al. |
| 6,337,730 | B1 | 1/2002 | Ozaki et al. |
| 6,414,733 | B1 | 7/2002 | Ishikawa et al. |
| 7,177,005 | B2 * | 2/2007 | Sugimura et al. ............ 349/189 |
| 2001/0002100 | A1 | 5/2001 | Compton et al. |
| 2002/0154266 | A1 * | 10/2002 | Choo et al. ................. 349/187 |
| 2006/0201424 | A1 * | 9/2006 | Hashizume et al. ......... 118/712 |

FOREIGN PATENT DOCUMENTS

| | | |
|---|---|---|
| EP | 1003066 | 5/2000 |
| JP | 51065656 | 6/1976 |
| JP | 57038414 | 3/1982 |
| JP | 57088428 | 6/1982 |
| JP | 58027126 | 2/1983 |
| JP | 59057221 | 4/1984 |
| JP | 59195222 | 11/1984 |
| JP | 60111221 | 6/1985 |
| JP | 60164723 | 8/1985 |
| JP | 60217343 | 10/1985 |
| JP | 61007822 | 1/1986 |
| JP | 61055625 | 3/1986 |
| JP | 62089025 | 4/1987 |
| JP | 62090622 | 4/1987 |
| JP | 62205319 | 9/1987 |
| JP | 63109413 | 5/1988 |
| JP | 63110425 | 5/1988 |
| JP | 63128315 | 5/1988 |
| JP | 63311233 | 12/1988 |
| JP | 05127179 | 5/1993 |
| JP | 5154923 | 6/1993 |
| JP | 05265011 | 10/1993 |
| JP | 05281557 | 10/1993 |
| JP | 05281562 | 10/1993 |
| JP | 06051256 | 2/1994 |
| JP | 06148657 | 5/1994 |
| JP | 6160871 | 6/1994 |
| JP | 6235925 | 8/1994 |
| JP | 06265915 | 9/1994 |
| JP | 6313870 | 11/1994 |
| JP | 7084268 | 3/1995 |
| JP | 07128674 | 5/1995 |
| JP | 07181507 | 7/1995 |
| JP | 08095066 | 4/1996 |
| JP | 8101395 | 4/1996 |
| JP | 08106101 | 4/1996 |
| JP | 08171094 | 7/1996 |
| JP | 08190099 | 7/1996 |
| JP | 08240807 | 9/1996 |
| JP | 09005762 | 1/1997 |
| JP | 09026578 | 1/1997 |
| JP | 9061829 | 3/1997 |
| JP | 09073075 | 3/1997 |
| JP | 09073096 | 3/1997 |
| JP | 09127528 | 5/1997 |
| JP | 09230357 | 9/1997 |
| JP | 09281511 | 10/1997 |
| JP | 09311340 | 12/1997 |
| JP | 10123537 | 5/1998 |
| JP | 10123538 | 5/1998 |
| JP | 10142616 | 5/1998 |
| JP | 10177178 | 6/1998 |
| JP | 10221700 | 8/1998 |
| JP | 10282512 | 10/1998 |
| JP | 10333157 | 12/1998 |
| JP | 10333159 | 12/1998 |
| JP | 11014953 | 1/1999 |
| JP | 11038424 | 2/1999 |
| JP | 11064811 | 3/1999 |
| JP | 11109388 | 4/1999 |
| JP | 11133438 | 5/1999 |
| JP | 11142864 | 5/1999 |
| JP | 11174477 | 7/1999 |
| JP | 11212045 | 8/1999 |
| JP | 11248930 | 9/1999 |
| JP | 11326922 | 11/1999 |
| JP | 11344714 | 12/1999 |
| JP | 2000002879 | 1/2000 |
| JP | 2000029035 | 1/2000 |
| JP | 20000056311 | 2/2000 |
| JP | 20000066165 | 3/2000 |
| JP | 2000137235 | 5/2000 |
| JP | 2000193988 | 7/2000 |
| JP | 2000241824 | 9/2000 |
| JP | 2000284295 | 10/2000 |
| JP | 2000292799 | 10/2000 |
| JP | 2000310759 | 11/2000 |
| JP | 2000310784 | 11/2000 |
| JP | 2000338501 | 12/2000 |
| JP | 2001005401 | 1/2001 |
| JP | 2001005405 | 1/2001 |
| JP | 2001013506 | 1/2001 |
| JP | 2001033793 | 2/2001 |
| JP | 2001042341 | 2/2001 |
| JP | 2001051284 | 2/2001 |
| JP | 2001066615 | 3/2001 |
| JP | 2001091727 | 4/2001 |
| JP | 2001117105 | 4/2001 |
| JP | 2001117109 | 4/2001 |
| JP | 2001133745 | 5/2001 |
| JP | 2001133794 | 5/2001 |
| JP | 2001133799 | 5/2001 |
| JP | 2001142074 | 5/2001 |
| JP | 2001147437 | 5/2001 |
| JP | 2001-157847 | 6/2001 |
| JP | 2001154211 | 6/2001 |
| JP | 2001166272 | 6/2001 |
| JP | 2001166310 | 6/2001 |
| JP | 2001183683 | 7/2001 |
| JP | 2001209052 | 8/2001 |
| JP | 2001209060 | 8/2001 |
| JP | 2001222017 | 8/2001 |
| JP | 2001235758 | 8/2001 |
| JP | 2001021000 | 9/2001 |
| JP | 2001255542 | 9/2001 |
| JP | 2001264782 | 9/2001 |
| JP | 2001026347 | 10/2001 |
| JP | 2001026348 | 10/2001 |
| JP | 2001272640 | 10/2001 |
| JP | 2001281675 | 10/2001 |
| JP | 2001282126 | 10/2001 |
| JP | 2001305563 | 10/2001 |
| JP | 2001330837 | 11/2001 |
| JP | 2001330840 | 11/2001 |
| JP | 2001356353 | 12/2001 |
| JP | 2001356354 | 12/2001 |
| JP | 2002014360 | 1/2002 |
| JP | 2002023176 | 1/2002 |
| JP | 2002049045 | 2/2002 |
| JP | 2002082340 | 3/2002 |

| | | | | | | |
|---|---|---|---|---|---|---|
| JP | 2002090759 | 3/2002 | | JP | 2002202512 | 7/2002 |
| JP | 2002090760 | 3/2002 | | JP | 2002202514 | 7/2002 |
| JP | 2002107740 | 4/2002 | | JP | 2002214626 | 7/2002 |
| JP | 2002122872 | 4/2002 | | KP | 20000035302 | 6/2000 |
| JP | 2002122873 | 4/2002 | | | | |
| JP | 2002080321 | 6/2002 | | * cited by examiner | | |

PORTABLE JIG

This application is a Divisional of prior application Ser. No. 10/302,869, filed Nov. 25, 2002 now abandoned.

This application claims the benefit of the Korean Application No. P2002-033267 filed on Jun. 14, 2002, which is hereby incorporated by reference for all purposes as if fully set forth herein. This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to a portable jig, and more particularly, to a portable jig for facilitating the transport and storage of a liquid crystal syringe.

2. Discussion of the Related Art

Generally, recent developments in the field of communications have increased the demand for various types of display devices. In response to this increased demand, numerous types of flat panel displays (e.g., liquid crystal displays (LCDs), plasma display panels (PDPs), electro-luminescent displays (ELDs), vacuum fluorescent displays (VFDs), etc.) have been developed.

Owing to their high resolution, light weight, thin profile, and low power consumption, LCD devices have been widely used in mobile devices (e.g., monitors of notebook computers) as well as televisions and computer monitors.

LCD devices generally include two substrates coupled to each other and separated by injected liquid crystal material. Liquid crystal materials exhibit mid-range and long-range molecular orders. Liquid crystal materials exhibit a mid-range molecular order upon melting (i.e., transitioning from a solid phase to a liquid phase), in that the liquid crystal material can assume a phase that is neither solid nor liquid. Accordingly, liquid crystals may exhibit properties of both liquids and crystals, within predetermined temperature ranges. Liquid crystal materials exhibit optical birefringence properties of optical anisotropic crystals when they are irradiated with light or when electric or magnetic fields are applied to them.

LCD devices are manufactured using a series of processes including array formation process, color filter formation process, liquid crystal (LC) cell formation process, and module formation process.

The array formation process includes steps of deposition, photolithography, and etching to form an array of thin film transistors (TFTs) on a first substrate. The color filter formation process includes the formation of a black matrix to shield light from being transmitted through a region, other than a pixel region, in a second substrate. The color filter formation process further includes steps of forming red (R), green (G), and blue (B) filters over the entire surface of the second substrate, and forming a common electrode made of ITO (Indium Tin Oxide) on the color filters.

The LC cell formation process includes steps of forming an LCD cell by bonding the first substrate, on which the array of TFTs are formed, to the second substrate, on which the black matrix, color filters, and common electrode are formed. The bonded substrates are spaced apart a uniform distance by a cell gap. The LC cell formation process further includes injecting liquid crystal material into the cell gap.

The module formation process includes the steps of manufacturing an LCD module by providing a circuit for signal processing, electrically connecting an LCD panel with the circuit via mounting technologies, and assembling other components.

A typical LC cell formation process will now be described in greater detail.

A first cassette (not shown), housing a first plurality of first substrates, and a second cassette (not shown), housing a second plurality of second substrates, are mounted into respective ports via loaders.

Each of the first and second substrates are designed to be used in the manufacture of at least one LCD panels. A plurality of gate lines are formed at fixed intervals along a first direction on the first substrate and a plurality of data lines are formed along a second direction on the first substrate, perpendicular to the first direction. Accordingly, a plurality of pixel regions may be formed in a matrix pattern at the crossing of each of the gate and data lines. A plurality of pixel electrodes are formed at the pixel regions and a plurality of thin film transistors (TFTs). In order to prevent light leakage in regions outside the pixel regions, a black matrix layer, color filters, and common electrode are sequentially formed on the second substrate.

Next, the first substrate and the second substrate are selected from the first and second cassettes, respectively, via a robot arm that is programmed to select each of the first substrates and the second substrates one at a time.

Figure 1:
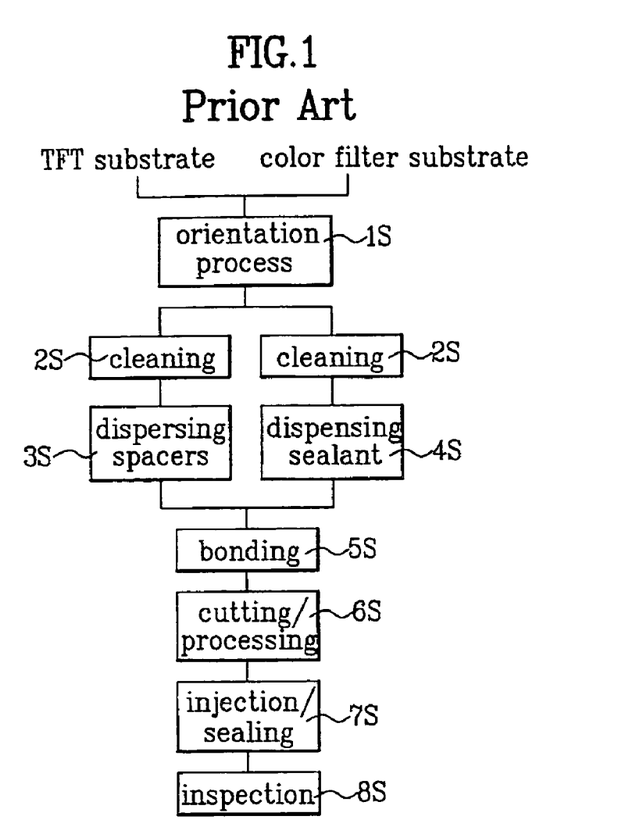
FIG. 1 illustrates a flow chart of a method for manufacturing an LCD according to a vacuum injection method.

Referring to FIG. 1, an orientation film formation process (1S) is performed wherein orientation films are deposited on each of the selected first and second substrates. The orientation films uniformly align the liquid crystal material within the cell gap. Particularly, the orientation film process (1S) is carried out by pre-cleaning each of the substrates, printing the orientation films, plasticizing the orientation films, inspecting the orientation films, and rubbing the orientation films.

After the orientation film process (1S) is completed, a gap formation process is then performed. During the gap formation process, the first and second substrates are cleaned (2S), spacers are dispensed on the first substrate so as to ensure the cell gap is uniform (3S), sealant is dispensed on the second substrate and a liquid crystal injection inlet is formed at an edge portion of each panel (4S), and the first and second substrates are pressed and bonded together (5S).

The bonded first and second substrates are then cut and processed into an LCD panel (6S).

Subsequently, liquid crystal material is injected through the liquid crystal injection inlet into the cell gap of each of the LCD panels and the liquid crystal injection inlet is then sealed (7S).

Lastly, cut surfaces of the first and second substrates are then polished, and the LCD panel is then inspected for appearance and electrical failure (8S).

The liquid crystal injection process will now be described in greater detail.

In injecting liquid crystal material, liquid crystal material is provided in a liquid crystal container, the liquid crystal container is loaded into a vacuum chamber, and pressure in the vacuum chamber is reduced, thereby creating a vacuum within the vacuum chamber so that any moisture adhered to the inner surface of the liquid crystal container or any air bubbles in the liquid crystal material are removed.

While maintaining the vacuum within the vacuum chamber, the liquid crystal injection inlet of an empty LC cell contacts, or is dipped into, the liquid crystal material in the liquid crystal container. The pressure of the vacuum chamber is then increased and, due to the pressure difference between the interior of the empty LC cell and the interior of the vacuum chamber, liquid crystal material is injected through the liquid crystal injection inlet into the cell gap.

There are, however, disadvantages to manufacturing LCD devices according to the above liquid crystal injection method.

First, the aforementioned liquid crystal injection method is a time consuming process. By performing the steps of cutting substrates into LCD panels, maintaining a vacuum within cell gap of the LCD panels, contacting the liquid crystal injection inlet with liquid crystal material, injecting liquid crystal material, a considerable amount of time is required to perform and the productivity of the process is thus reduced.

Secondly, as LCD panels get larger, liquid crystal material may not be completely injected into the cell gap.

Thirdly, the aforementioned injection process is very complex and a wide variety of considerably large injection apparatuses are required.

SUMMARY OF THE INVENTION

Accordingly, the present invention is directed to a portable jig that substantially obviates one or more problems due to limitations and disadvantages of the related art.

An advantage of the present invention provides a portable jig for facilitating the transport and storage of liquid crystal syringes.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a portable jig includes a supporting die including at least one inspection hole; at least one receiving hole for receiving a portion of at least one liquid crystal syringe and including a flange for securing a portion of the liquid crystal syringe; and a hermetically sealed lower face.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

In accordance with the principles of the present invention, liquid crystal material may be introduced to the LCD panel via a liquid crystal dispensing method. The liquid crystal dispensing method forms a liquid crystal layer by dispensing liquid crystal material onto a substrate and uniformly distributing the dispensed liquid crystal material over the entire surface of the substrate by pressing the substrate. The aforementioned liquid crystal dispensing method enables the liquid crystal material to be arranged on the substrate within a short period of time so that the process of forming a liquid crystal layer in large LCD panels may be performed quickly. Since a predetermined amount of liquid crystal material is dispensed on the substrate, consumption of liquid crystal material is minimized. Accordingly, costs of manufacturing LCDs may be reduced.

Figure 2:
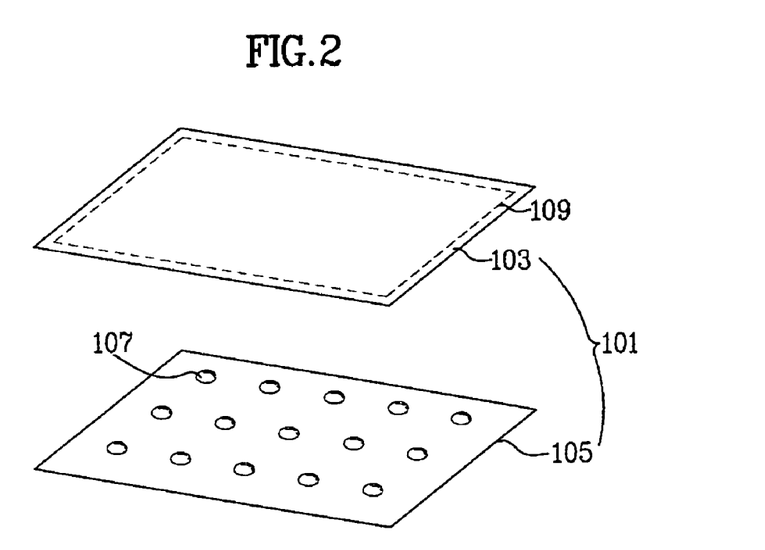
FIG. 2 illustrates a perspective view of a liquid crystal dispensing method according to the present invention.

FIG. 2 illustrates a schematic view of the liquid crystal dispensing method.

Referring to FIG. 2, the liquid crystal dispensing method may be performed prior to bonding a lower substrate (i.e., a TFT substrate) 105, on which driving elements are formed, and an upper substrate (i.e., a C/F substrate) 103, on which color filters are formed. Accordingly, liquid crystal material may be dispensed on the lower substrate 105, for example, in the form of a droplet 107. Alternatively, liquid crystal 107 may be dispensed on the upper substrate 103. During the bonding process, however, the substrate on which the liquid crystal material 107 is dispensed should be arranged such that it is located under the other substrate, wherein the liquid crystal material 107 is arranged between the two substrates.

Sealant 109 may be dispensed along edges on the upper substrate 103 to bond the upper substrate 103 to the lower substrate 105 when they are pressed together. As the upper and lower substrates 103 and 105, respectively, are pressed, the liquid crystal material 107 is spread so that a liquid crystal layer having a uniform thickness is formed between the upper substrate 103 and the lower substrate 105. Subsequently, the bonded substrates may be separated into individual LCD panels.

Manufacturing LCDs according to the aforementioned liquid crystal dispensing method is advantageous over the liquid crystal injection method illustrated, for example, in FIG. 1 in that liquid crystal layers may be rapidly formed between the upper and lower substrates. Using the liquid crystal injection method, only LCD panels having the same size cell gap may be simultaneously injected with liquid crystal material under the same processing conditions (e.g., same liquid crystal container, same injection pressure, etc.). By dispensing liquid crystal material on a substrate, however, a controlled amount of liquid crystal material may be dispensed on many LCD panels having the same or different cell gaps.

The liquid crystal dispensing method includes a liquid crystal syringe provided within a liquid crystal dispensing apparatus.

A liquid crystal syringe according to an embodiment of the present invention will now be described with reference to FIG. 3.

Figure 3:
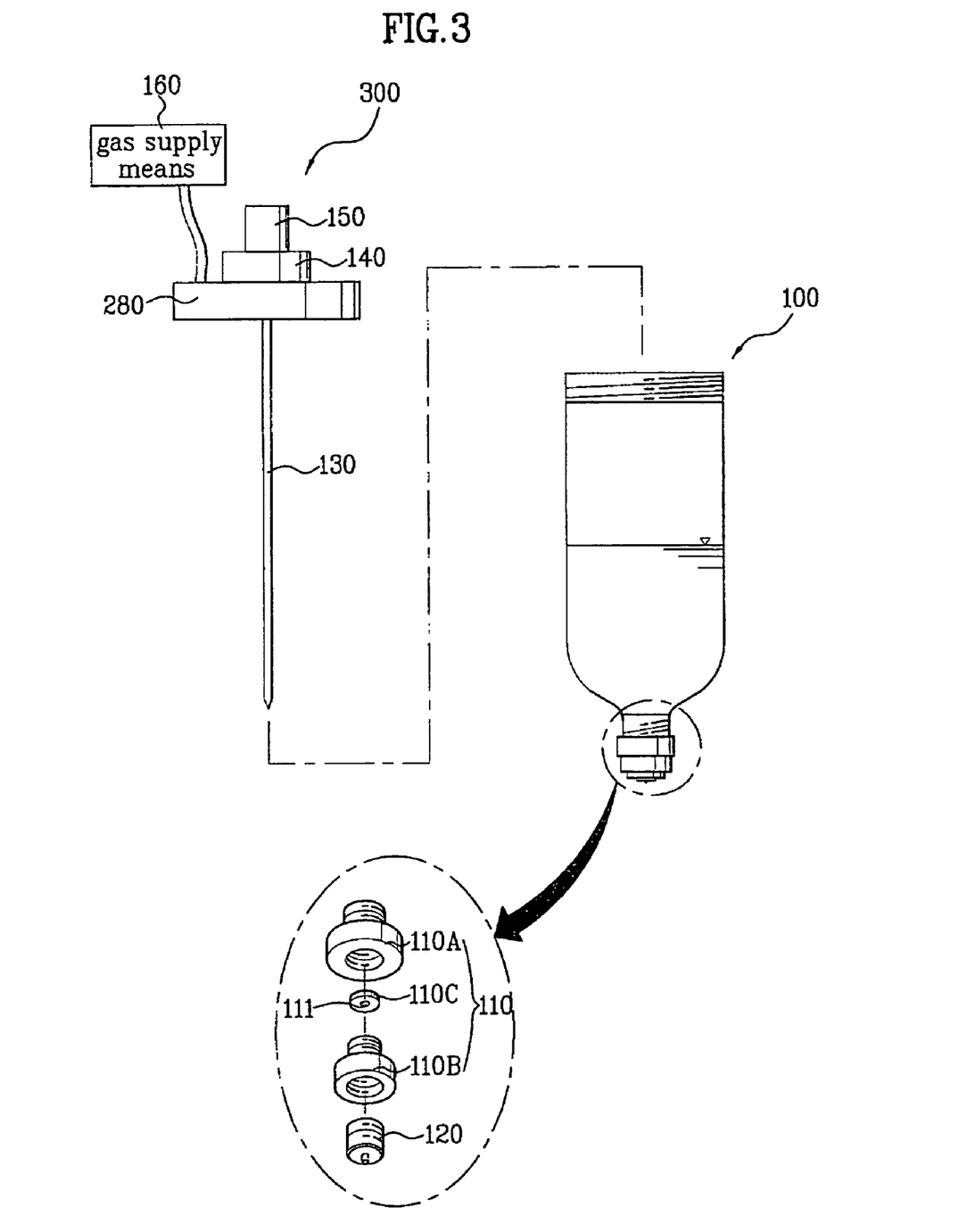
FIG. 3 illustrates an exemplary view of a liquid crystal syringe according to the present invention.

Referring to FIG. 3, the syringe may, for example, include a liquid crystal (LC) container 100 and a control part 300 for controlling the amount of liquid crystal material dispensed. The control part 300 may be coupled with the LC container 100 via a coupling means 280 that may also function as a lid of the LC container 100.

An dispensing regulator 110 may be coupled to a portion of the LC container 100. A nozzle 120, through which liquid crystal material exits the LC container 100, may be coupled to the dispensing regulator 110.

In one aspect of the present invention, the control part 300 may, for example, include a needle 130 arranged within the LC container 100 for controlling the dispensing of the liquid crystal material, a clearance adjusting part 140 for adjusting a clearance of the needle 130, a solenoid means 150 for controlling upward and downward movements of the needle 130, and a gas supply means 160 for pressurizing the LC container 100.

In one aspect of the present invention, the LC container 100 may be formed from a material having a high moldability, high strength, and that does not react with liquid crystal material (e.g., polyethylene, etc.).

In another aspect of the present invention, the dispensing regulator 110 may include a first coupling part 110A, a second coupling part 110B, and a needle sheet 110C arranged between the first and second coupling parts 110A and 110B, respectively. A first end portion of each of the first and second coupling parts 110A and 110B, respectively, may include a female screw portion and a second end portion may include a male screw portion. An exhaust hole 111 may be arranged within the needle sheet 110C. The exhaust hole 111 may be contacted by the needle 130 and may function as a passage through which liquid crystal material exits the LC container 100.

The LC container 100 may include a coupling part for coupling with the dispensing regulator 110. In one aspect of the present invention, the coupling part may include a female portion for coupling with the second end portion of the first coupling part 110A. The first end portion of the first coupling part 110A may be coupled with the second end portion of the second coupling part 110B. While the first end portion of the first coupling part 110A is coupled with the second end portion of the second coupling part 110B, the needle sheet 110C may be arranged between, and in contact with, the two coupling parts. The nozzle 120 may be coupled with the first end portion of the second coupling part 110B.

A spring (not shown) may be provided proximate needle 130. In one aspect of the present invention, the spring allows the needle 130 to contact the exhaust hole 111 and prevent the dispensing of liquid crystal material.

In one aspect of the present invention, a solenoid means 150 may be provided proximate the needle 130. When a magnetic force is generated by power applied to a solenoid coil (not shown), the solenoid means 150 drives the needle 130 upward. When the needle 130 is driven upward, nitrogen (N$_2$) gas, which is supplied within portions of the LC container 100 not occupied by liquid crystal material through the gas supply means 90 from an external gas supply part, presses the liquid crystal material in the LC container 100 such that the liquid crystal material exits the LC container 100. When the power ceases to be applied to the solenoid coil, the spring forces the needle 130 to return to its original location at the exhaust hole 111. Thus, the liquid crystal material may be selectively dispensed by the upward and downward movements of the needle 130.

In accordance with the principles of the present invention, the ability of the liquid crystal syringe to precisely dispense a predetermined amount of liquid crystal material depends heavily on the manner in which the syringe is assembled and stored. If the amount of liquid crystal material dispensed is deficient, air bubbles may be trapped in the cell gap between the bonded substrates. If the amount of liquid crystal dispensed is excessive, non-uniform display characteristics may be exhibited by the LCD panel. To this end, it is important that the amount of liquid crystal material dispensed by the syringe is precisely controlled.

Figure 4:
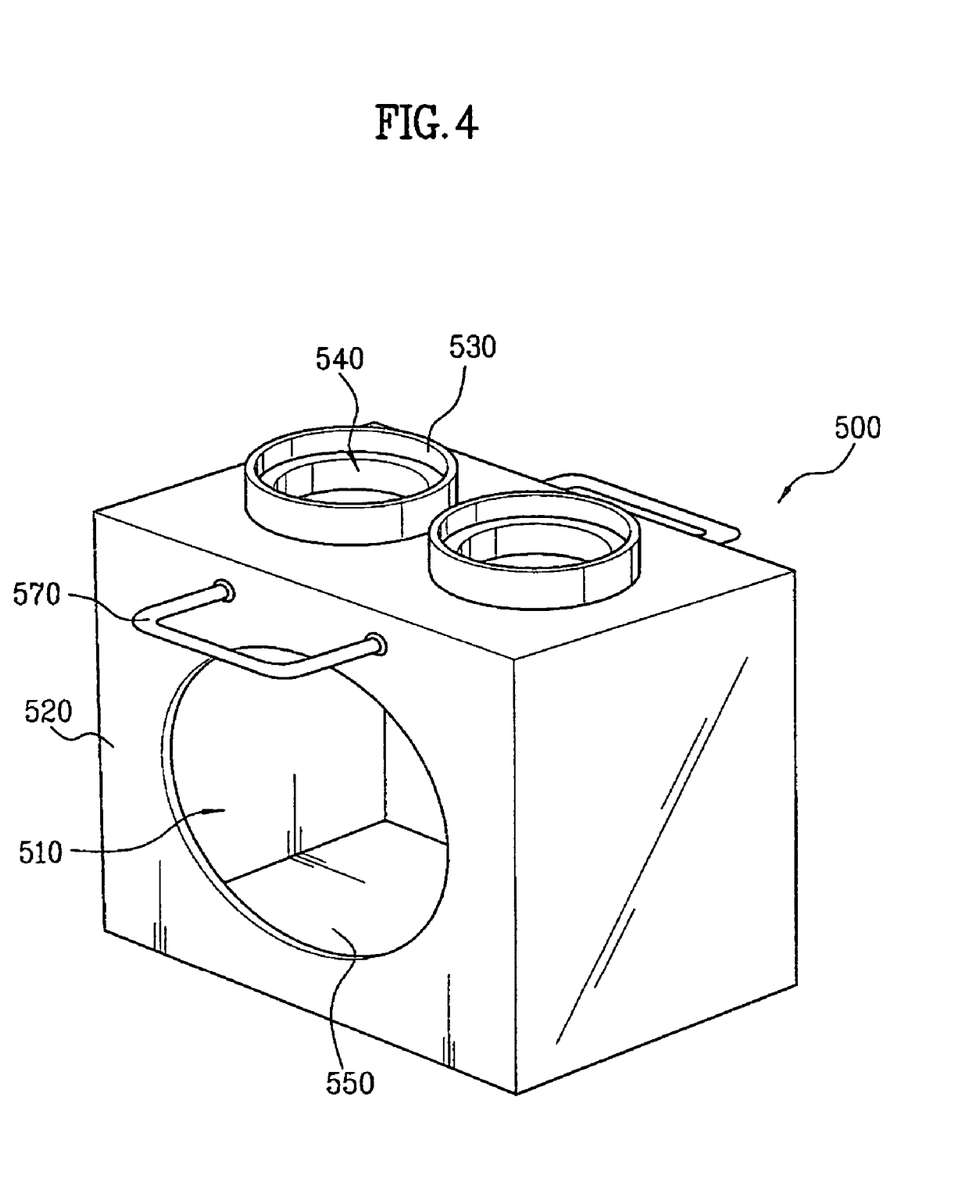
FIGS. 4 and 5 illustrate perspective and sectional views of a portable jig according to the present invention.
Figure 5:
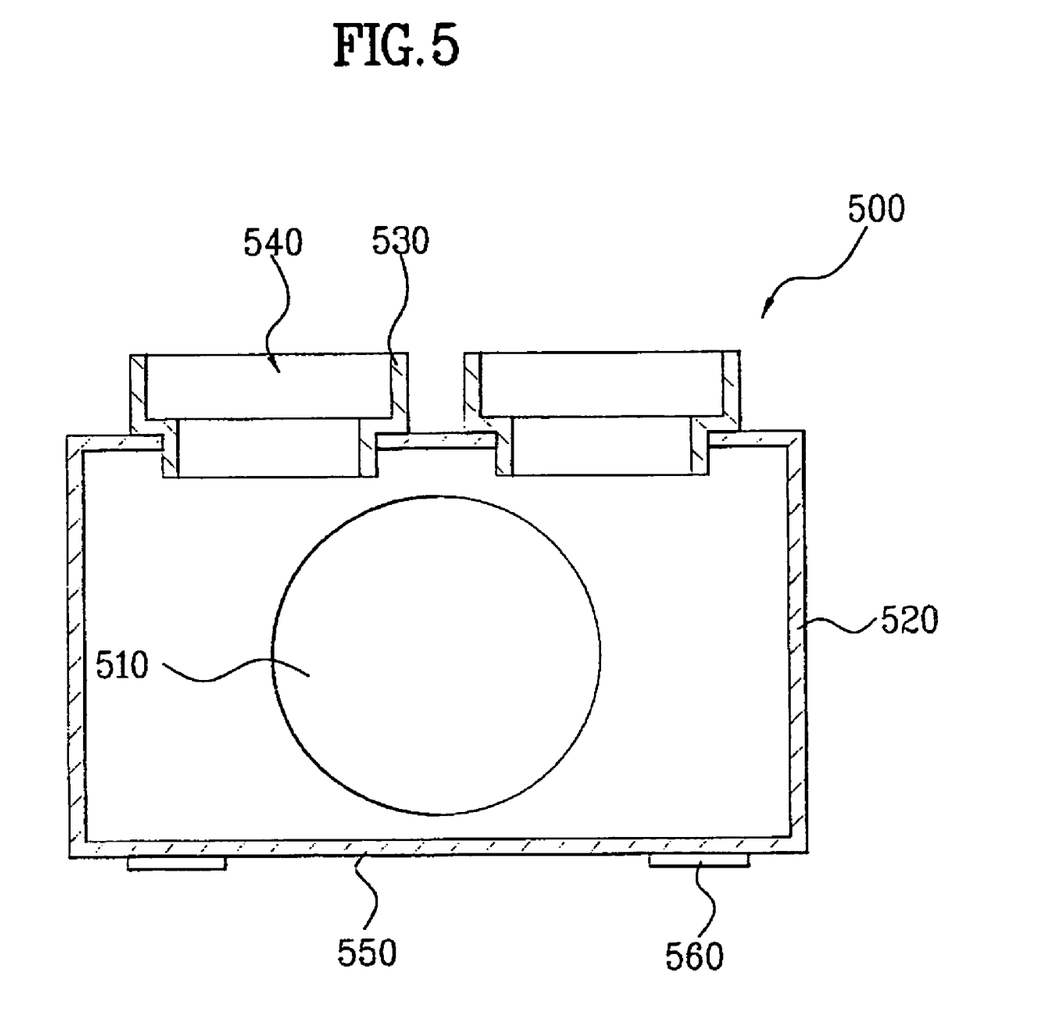

Accordingly, a jig according to an embodiment of the invention facilitating the transport and storage of liquid crystal syringes is illustrated in FIGS. 4 and 5.

Referring to FIGS. 4 and 5, a portable jig 500 for facilitating the transport and storage of the liquid crystal syringe may, for example, include a supporting die 520 having at least one inspection hole 510 formed therein, at least one receiving hole 540 for receiving at least one liquid crystal syringe wherein the at least one receiving hole includes a flange 530 for supporting an end portion of the liquid crystal syringe, a hermetically sealed lower face 550, and a handle 570 integrally formed with the supporting die 520.

In one aspect of the present invention, the inspection hole 510 may be formed in the supporting die so as to minimize the weight of the portable jig 500. Additionally, the inspection hole 510 enables the presence of syringes within the portable jig 500 to be visually confirmed. As liquid crystal material may leak from the liquid crystal syringe placed in storage, the inspection hole 510 formed in the supporting die 520 may have dimensions that do not contact the lower face 550.

The cross-sectional dimensions of the at least one receiving hole 540 may be the same as the cross-sectional dimensions of the liquid crystal container 100 shown in FIG. 3 so that the liquid crystal container 100 may be securely received. A peripheral portion of the flange 530 may have the same cross-sectional dimensions as the cross-sectional dimensions of the coupling means 280 so that the coupling means 280 may be secured by the flange 530. In one aspect of the present invention, the flange may be made out of a material capable of cushioning the liquid crystal syringe (e.g., Teflon). Lastly, pad 560 may be attached to a bottom portion of the lower face 550 for preventing the portable jig from slipping.

The portable jig according to the principles of the invention facilitates the transport and storage of liquid crystal syringes. Accordingly, liquid crystal syringes stored and transported with the portable jig of the present invention may effectively and precisely dispense a predetermined amount of liquid crystal material.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for fabricating a liquid crystal display (LCD) device, comprising:

providing a first substrate and a second substrate;

dispensing liquid crystal on the first substrate using a liquid crystal syringe that includes a liquid crystal container for containing the liquid crystal and a control part coupled to the liquid crystal container for controlling a dispensing amount of the liquid crystal;

transporting the liquid crystal syringe using a portable jig, the portable jig further including a supporting die; at least one receiving hole formed at an upper portion of said supporting die; a flange provided within said at least one receiving hole for securing the liquid crystal syringe over the upper portion of said supporting die; at least one inspection hole at a side portion of the supporting die, wherein the at least one inspection hole is adapted to enable inspection of an inside of the portable jig; and a lower face hermetically sealed to said supporting die, opposing said at least one receiving hole; and attaching the first and second substrates to each other.

2. The method according to claim 1, wherein the at least one inspection hole does not contact the lower face.

3. The method according to claim 1, wherein the at least one receiving hole has the same cross-sectional dimensions as the liquid crystal syringe.

4. The method according to claim 1, further comprising a pad formed on a bottom portion of the lower face.

5. The method according to claim 4, wherein the pad is formed rubber.

6. The method according to claim 1, further comprising a handle integrally formed with the supporting die.

7. The method according to claim 1, wherein said supporting die is formed from stainless steel.

8. The portable jig according to claim 1, wherein said flange is formed from Teflon.

9. A method for fabricating a liquid crystal display (LCD) device, comprising:

providing a first substrate and a second substrate;

dispensing liquid crystal on the first substrate using a liquid crystal syringe that includes a liquid crystal container for containing the liquid crystal and a control part coupled to the liquid crystal container for controlling a dispensing amount of the liquid crystal;

transporting the liquid crystal syringe using a portable jig, the portable jig further including a supporting die; at least two receiving holes aligned in a first direction at an upper portion of said supporting die; a flange provided within said at least two receiving holes for securing a liquid crystal syringe over the upper portion of said supporting die; at least one inspection hole at a side portion of the supporting die parallel to the first direction, wherein the at least one inspection hole is adapted to enable inspection of an inside of the portable jig; and a lower face hermetically sealed to said supporting die, opposing said at least two receiving holes; and attaching the first and second substrates to each other.

* * * * *